Oct. 9, 1928.
M. C. SCHWEINERT
1,686,642
COMBINED VALVE CAP AND DUST CAP
Filed May 20, 1922
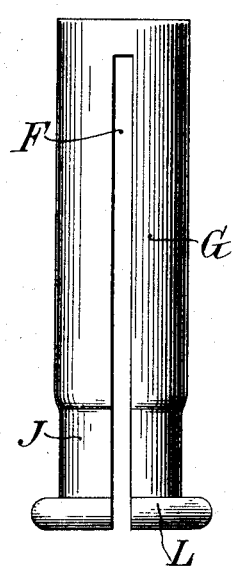
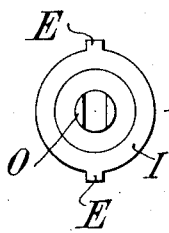
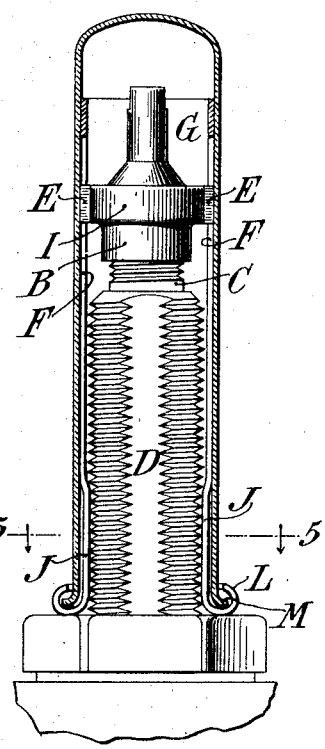
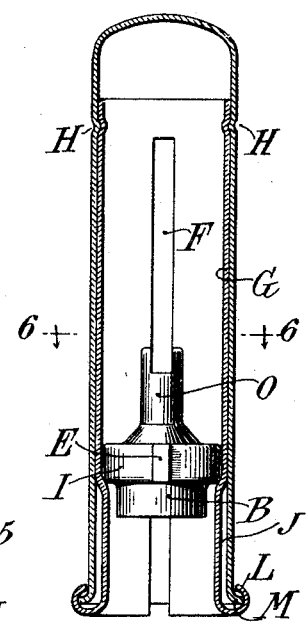
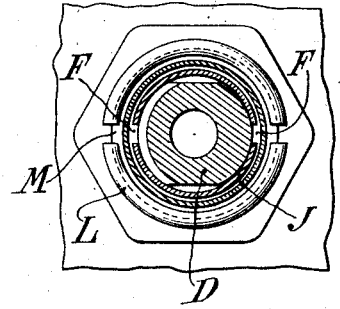
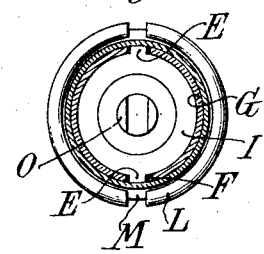
INVENTOR:
Maximilian Charles Schweinert,
By Attorneys, Patented Oct. 9, 1928.

1,686,642

UNITED STATES PATENT OFFICE.

MAXIMILIAN CHARLES SCHWEINERT, OF NEW YORK, N. Y., ASSIGNOR TO A. SCHRADER'S SON, INCORPORATED, OF BROOKLYN, NEW YORK, A CORPORATION OF NEW YORK.

COMBINED VALVE CAP AND DUST CAP.

Application filed May 20, 1922. Serial No. 562,502.

This invention relates to a combined valve cap and dust cap for pneumatic tire valves or the like, and aims to provide certain improvements therein.

The invention is directed to that type of combined valve cap and dust cap in which the valve cap or its equivalent slides along the inside of the dust cap, so that if desired the two caps may be removed and applied as a whole.

In the drawings, wherein I have illustrated one form of the invention,—

Figure 1 is an elevation of the preferred form of cap.

Fig. 2 is an enlarged diametrical section of Fig. 1, showing the cap applied to a valve casing.

Fig. 3 is a diametrical section of the dust cap, the valve cap being shown in elevation.

Fig. 4 is an elevation of the inside sleeve.

Fig. 5 is a cross-section on the line 5—5 in Fig. 2.

Fig. 6 is a cross-section on the line 6—6 of Fig. 3.

Fig. 7 is a top view of the valve cap.

Referring to the drawings, let A indicate a dust cap which may be of any suitable configuration or shape on its exterior. B is the valve cap which is adapted to screw on the nipple C of the valve casing D. The valve cap B is provided with two or more lugs E E which are adapted to move in grooves formed in the dust cap or in a part or parts carried thereby. This insures a non-rotative connection between the valve cap and dust cap, so that the valve cap can be screwed or unscrewed by manipulation of the dust cap. In the construction shown the grooves (indicated by the reference letters F F) are formed in a sleeve G which is shown detached in Figure 4. This sleeve is retained within the cap in any suitable manner as by indentations H, which serve not only to prevent the sleeve from dropping out of the cap, but also to insure a non-rotative connection between the sleeve and cap. Preferably the valve cap has a frictional contact with the dust cap or the sleeve G sufficient to hold it in place against ordinary movements, while permitting it to slide along the interior of the cap if sufficient force is used. Such frictional contact may be accomplished in various ways, as for instance, by fitting the flange I of the valve cap closely to the sleeve G, the latter having sufficient spring to insure a frictional grip on the cap. Or the grooves F may be slightly smaller than the projections E on the valve cap, so that a frictional grip is secured in this way. Preferably both are used, although the valve cap may freely move along the interior of the dust cap if desired.

Preferably the dust cap is not held on the valve casing solely by its frictional grip of the valve cap, but is provided with means for holding it independently by frictional contact with the valve casing. To this end the lower part of the sleeve G (as shown at J) is bent inwardly to grip the valve casing, there being considerable spring in the bifurcated sleeve and an effective frictional grip is thus obtained on the valve casing. Preferably also the lower end of the sleeve is turned upwardly, as shown at L, over a flange M formed on the lower part of the dust cap, so that an additional connection between the sleeve and dust cap is thus formed, which prevents separation of the two.

The valve cap may be irremovably secured within the dust cap if desired, but by preference the dust cap and valve cap are capable of being separated by a distinct effort if it is desired to do so. This permits the use of the valve cap as heretofore for screwing and unscrewing the valve insides by means of the usual screw-driver projection O formed on the valve cap. To permit the separation of the two, the slots or grooves F of the sleeve are continued down to the bottom of the latter, and the frictional gripping portion J is so proportioned that by pulling smartly on the dust cap while the valve cap is screwed in position, the dust cap is caused to ride over the flange I on the valve cap, thus separating the two. The construction thus described provides a cheap and simple form of combined valve cap and dust cap, wherein the dust cap is held in position not only by its frictional hold upon the valve cap, but also by its frictional hold on the valve casing. It also provides a structure in which the valve cap will normally move with sufficient friction to insure its easy application to the valve casing by manipulation of the dust cap, while at the same time it resists separation of the two unless an intentional effort is made to separate them.

It will be understood that various changes may be made in the structure thus described without departing from the invention. It will also be understood that the valve cap may move in the dust cap more or less loosely if desired, and that it may be permanently connected thereto.

What I claim is:—

1. A combined valve cap and dust cap, comprising a dust cap having an interior sleeve provided with grooves and a valve cap having lugs sliding in said grooves.

2. A combined valve cap and dust cap, comprising a dust cap having an interior sleeve cut to form grooves, and a valve cap having lugs sliding in said grooves.

3. A combined valve cap and dust cap, comprising a dust cap having an interior sleeve adapted to frictionally engage a valve cap.

4. A combined valve cap and dust cap, comprising a dust cap having an interior sleeve and grooves in said sleeve, said sleeve being adapted to engage portions of the valve cap to prevent relative rotation, and said sleeve frictionally engaging said valve casing.

5. A combined valve cap and dust cap, comprising a dust cap having an interior sleeve and grooves in said sleeve, said sleeve being adapted to engage portions of the valve cap to prevent relative rotation, and said sleeve frictionally engaging said valve casing by contact with the body of the casing.

6. A combined valve cap and dust cap, comprising a dust cap having an interior sleeve and grooves in said sleeve, said sleeve being adapted to engage portions of the valve cap to prevent relative rotation, and said sleeve frictionally engaging said valve cap by contact between the walls of said grooves and said cap.

7. A combined valve cap and dust cap, comprising a dust cap having an interior sleeve, a valve cap nonrotatively held by said sleeve and said sleeve having portions adapted to engage a valve casing to hold it frictionally thereon.

8. A combined valve cap and dust cap, comprising a dust cap having an interior sleeve formed with grooves or slots therein, a valve cap having projections moving in said grooves or slots, said sleeve having means for frictionally engaging a valve casing.

9. A combined valve cap and dust cap, comprising a dust cap having an interior sleeve formed with grooves or slots therein, a valve cap having projections moving in said grooves or slots, said sleeve having portions of smaller diameter adapted to engage a valve casing.

10. A combined valve cap and dust cap, comprising a dust cap having an interior sleeve, having slots extending to the bottom thereof, and the valve cap having lugs adapted to move along said slots until the caps are separated.

11. A combined valve cap and dust cap, comprising a dust cap having an interior sleeve having grooves or slots formed therein, the valve cap having lugs movable along said slots, and the sleeve having restricted portions near its bottom adapted to engage a valve casing.

12. A dust cap having an elongated sleeve held therein formed with slots, and a restricted portion near its bottom, adapted to frictionally engage a valve casing.

13. A valve cap having lugs at its sides adapted to engage another part, whereby the valve cap may be rotated.

14. A combined dust cap and valve cap comprising a dust cap and a valve cap adapted to move longitudinally within the dust cap with a degree of friction sufficient to hold the valve cap in any adjusted position within the dust cap, and means providing a greater degree of friction between the two normally opposing but permitting complete separation of the valve cap and dust cap without injury to either.

In witness whereof, I have hereunto signed my name.

MAXIMILIAN CHARLES SCHWEINERT.